March 18, 1941. C. M. ASHLEY 2,235,005
AIR CONDITIONING METHOD
Filed April 6, 1938
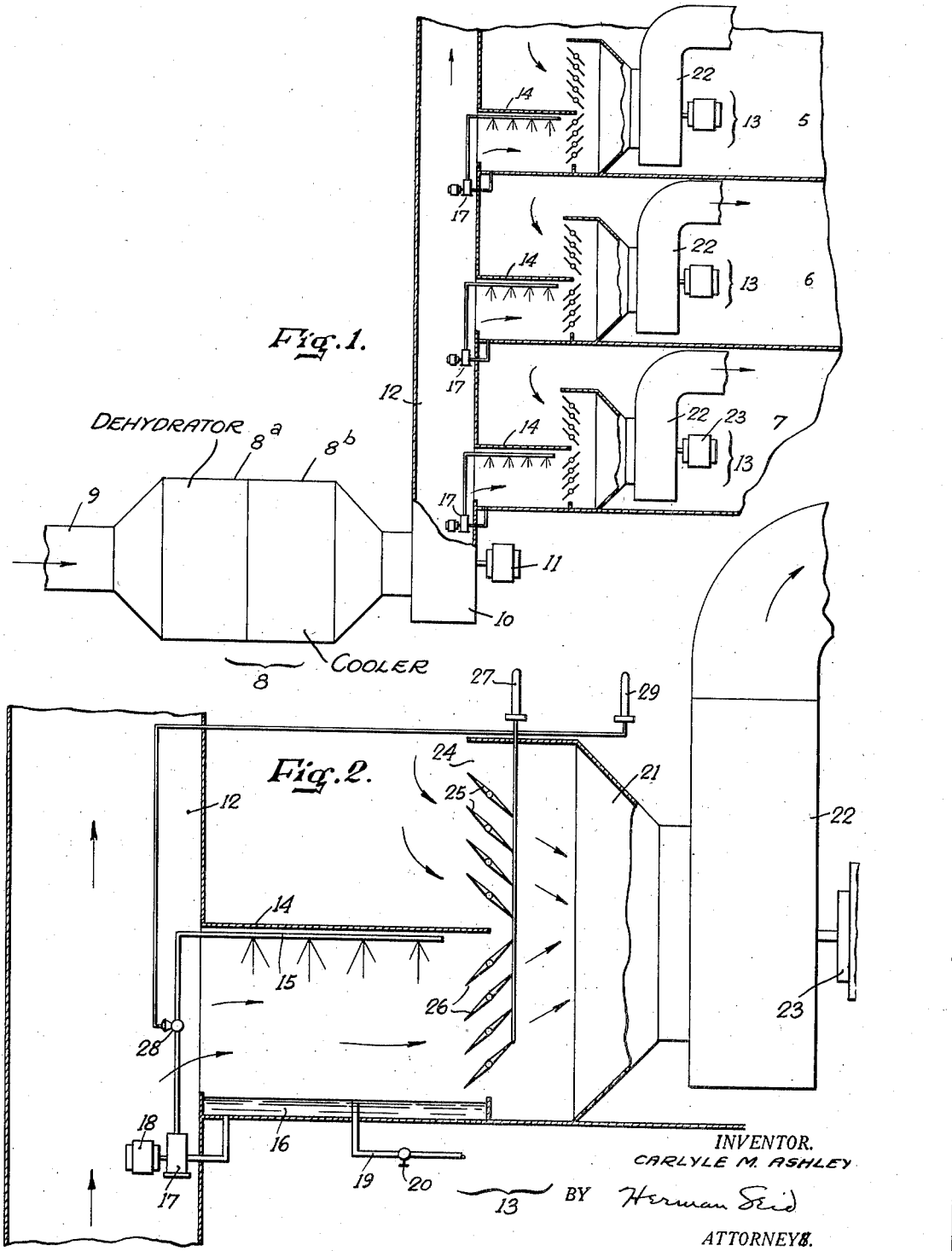
INVENTOR.
CARLYLE M. ASHLEY
BY Herman Seid
ATTORNEYS.

Patented Mar. 18, 1941

2,235,005

UNITED STATES PATENT OFFICE 2,235,005

AIR CONDITIONING METHOD

Carlyle M. Ashley, Syracuse, N. Y., assignor to Carrier Corporation, Syracuse, N. Y., a corporation of Delaware Application April 6, 1938, Serial No. 200,495

4 Claims. (Cl. 236—44)

This invention relates to air conditioning.

The general object of the invention is to provide an air conditioning apparatus for producing and maintaining desired atmospheric conditions in one or more conditioned enclosures.

In the conditioning of enclosures occupied by persons whose comfort and health are primary considerations, it is necessary that a quantity of outdoor air be supplied to such enclosures at all times, in order to meet the ventilation requirements of the occupants. Under summer operating conditions in most localities the fresh air thus supplied is usually hot and humid and requires reduction of its moisture content in order that it may be used to create and maintain comfortable atmospheric conditions within the enclosures. Also, in cooling enclosures for comfort, it is common practice to recirculate a portion of the air withdrawn from the enclosure. In conventional installations the quantity of air thus recirculated may be of the order of four or five times the quantity of fresh air introduced into the enclosure. In its circulation through the occupied enclosure, the conditioned air is subject to a substantial increase in moisture content, due to the evaporation of water from the bodies of the occupants, as is well understood. Thus, in order that it may be suitably prepared for re-supply to the enclosure, this air withdrawn from the enclosure for recirculation must also have its moisture content reduced in order that comfortable atmospheric conditions may be created and maintained in the enclosure.

Similarly, in certain industrial applications of air conditioning, it is necessary to remove moisture from the air in order to provide desired atmospheric conditions.

Reduction of the moisture content of the air may be accomplished broadly by either of two methods, namely, dehumidification and dehydration. When the air is dehumidified, it is subjected to heat exchange with a cooling medium or refrigerant which reduces the dry bulb temperature below the original dewpoint of the air, thus precipitating moisture from the air. This method has the disadvantage that the cooling process and the process of moisture reduction are definitely and inseparably interrelated, thus creating control problems. Further, the air which has been dehumidified is necessarily at a relatively low dry bulb temperature and hence, in most applications, must be reheated before it may be introduced into the enclosure to be conditioned.

According to one system heretofore known, air is dehumidified at a central conditioning point and is distributed at the low temperature resulting from the dehumidifying process to a series of units located in or adjacent different areas to be conditioned, or at different parts of the same area. Each of these units contains a fan for withdrawing the cold dehumidified air from the distributing ducts and also for intaking return air from the conditioned area, the return air being used to reheat the dehumidified air so that each unit discharges a mixture having a desired temperature and humidity. While this system has the advantage of reducing the size of the ductwork required for distributing air from the central conditioning point, inasmuch as only a part of the air supplied to the conditioned area or areas is circulated thereto from the central conditioner, this system possesses the disadvantage that the air passing from the dehumidifier to the local units is so cold that the distributing ducts must be heavily insulated in order to prevent condensation of moisture upon the ducts.

According to the present invention, there is provided a system in which a central station conditioner is used for dehydrating air supplied to a plurality of local units, as above described. The dehydration may be accomplished by the liquid absorption method, using a solution of such a salt as lithium chloride or calcium chloride, or by the solid adsorption, using silica gel or the like. The air thus dehydrated has a relatively low dewpoint or moisture content and has a relatively high dry bulb temperature. Thus, this air may be distributed through ducts which do not require heavy insulation, as in the system above referred to. Condensation of moisture upon the duct will not occur because the high dry bulb temperature of the dehydrated air is, under most normal operating conditions, considerably higher than the dewpoint of the air surrounding the duct.

In the dehydration process, the latent heat of the water removed from the air is converted to sensible heat, so that the dehydrated air has a relatively high dry bulb temperature, although its wet bulb temperature remains unchanged. The wet bulb temperature of the dehydrated air may be reduced, however, by passing it in contact with cooling coils, preferably located proximate the dehydrator at the central conditioning point. Preferably the cooling coils are supplied with cooling medium such as cold water from a city main or the like, and are so designed and controlled that while they somewhat reduce the dry bulb temperature of the dehydrated air, the air leaving the coils will have a dry bulb temperature which is ordinarily higher than the dewpoint temperature of the air surrounding the distributing ducts.

According to the present invention, the low wet bulb temperature and moisture content of the air thus conditioned are utilized to reduce the dry bulb temperature of the dehydrated air at the local units by intimately contacting the dehydrated air with water spray. In accordance with well understood principles, the dehydrated air thus absorbs moisture and its dry bulb temperature is reduced, the air tending to become saturated at its wet bulb temperature. By suitably regulating the amount of water with which the dehydrated air is contacted, the reduction in the dry bulb temperature of such air may be suitably controlled.

After the dehydrated air has thus been cooled by adiabatic evaporation, it is mixed with a volume of air withdrawn from the enclosure and this mixture, having desired temperature and humidity, is discharged into the enclosure. In a preferred form of the invention, the proportions of conditioned air and recirculated air in the mixture supplied to the enclosure are regulated in accordance with the temperature in the enclosure, to insure the maintenance of desired atmospheric conditions therein.

Other objects, features and advantages of the invention will be more apparent from the following description, to be read in connection with the accompanying drawing, in which Fig. 1 diagrammatically illustrates one embodiment of the invention, and Fig. 2 is a view on an enlarged scale of a portion of Fig. 1.

Referring now to the drawing, numerals 5, 6 and 7 generally designate different enclosures which are to be conditioned. While the invention is described with reference to individual enclosures, it is to be understood that it may also be applied to the conditioning of different areas of a single enclosure.

The enclosures 5, 6 and 7 are served by a central conditioning unit 8, which is supplied with air from any desired source, preferably the outside atmosphere, through duct 9 under the influence of fan 10, driven by motor 11. Dehydrator 8a may be of any desired type or construction and may utilize either a liquid absorber or a solid adsorber, such as silica gel. Any suitable control may be used for maintaining the moisture content of the dehydrated air at a predetermined point. Since such dehydrators and controls therefor are well known and understood by those skilled in the art, and since such conditioner does not, per se, form part of the present invention, no further description thereof is deemed required here. The air delivered from dehydrator 8a has a low dewpoint, but has a relatively high dry bulb temperature, these conditions being usual incidents of the dehydrating process. This air is then preferably passed over a cooling coil or the like 8b, suitably supplied with cooling medium such as cold water, whereby the dry bulb temperature and wet bulb temperature of the air are somewhat reduced, the moisture content of the air remaining unchanged. The air delivered from fan 10 is distributed through main distributing duct 12 to a plurality of units generally designated 13. As shown, each unit 13 serves a different enclosure, but as pointed out above, two or more of these units could be used for conditioning a single enclosure without departing from the scope of the invention. Each unit 13 includes an entrance passage 14 communicating with duct 12 and adapted to receive relatively hot dry air therefrom. Each passageway 14 is provided with a spray device or the like, 15, adapted to spray air passing through passage 14, thus to reduce the dry bulb temperature of the dehydrated air. As pointed out above, the spraying of the dehydrated air causes the dry bulb temperature to approach the wet bulb temperature of the air, and since the wet bulb temperature of the air delivered from the central conditioning unit 8 is relatively low, the dry bulb temperature of the air discharged from passage 14 may be relatively low. By regulating the supply of water to sprays 15, the partial saturation of air in passage 14 may be controlled to any desired degree, the dry bulb temperature reduction of the air being correspondingly controlled.

Unevaporated water falls into sump 16, whence it is recirculated by pump 17, driven by motor 18. Since the sprayed moisture is evaporated into the air passing through passage 14, it is necessary to provide a suitable water supply, and to this end there is provided a water supply line 19 suitably equipped with a valve 20 for regulating the supply of water to the sump 16.

Each passage 14 communicates with a mixing chamber 21, the outlet of which communicates with the intake of a fan 22 driven by motor 23. Each mixing box 21 is provided with an inlet opening 24 communicating with the conditioned enclosure and adapted to pass air withdrawn therefrom by the fan 22. Opening 24 is provided with dampers 25 and passage 14 is provided with dampers 26. Dampers 25 and 26 are reciprocally connected so that as dampers 25 are closed, dampers 26 are correspondingly opened wider, and vice-versa. Thus, although the total volume of air delivered to mixing chamber 21 remains constant, the proportions of conditioned air and return air supplied to the mixing box may be varied.

In a preferred form of the invention, dampers 25 and 26 are controlled in accordance with changes in a characteristic, such as temperature, of air in the conditioned enclosure. Such control may be effected by means of a thermostat or the like, 27, located in the conditioned enclosure or at any other desired point in the air circulating system, controlling the position of the dampers by means of an air motor or the like. Since thermostatic control of dampers is well-known and understood, no further description of the structural details of this feature is deemed required here. As the temperature in the enclosure drops below a predetermined point, dampers 26, controlling the supply of conditioned air, are closed somewhat, and dampers 25, controlling the supply of return air, are correspondingly opened wider. When the thermostat 27 indicates too high a temperature in the conditioned enclosure, reverse operation of the dampers occurs, the dampers controlling the supply of return air then being somewhat closed and the dampers controlling the supply of conditioned air being correspondingly opened wider.

Further, the degree to which the conditioned air is resaturated by spray devices 12 may be controlled in any suitable manner, as for example, by valve 28, preferably of the modulating type, in the liquid line feeding to the spray device. Valve 28 may be controlled under control of room hygrostat or the like 29, responding to changes in relative humidity, the valve closing somewhat responsive to an unduly high relative humidity and opening somewhat wider when the humidity is lower than desired.

In practice, the units 13 will generally be located at a considerable distance from the central conditioner 8. For example, the conditioner 8 may be positioned in the attic or cellar of a large theatre and the different units 13 may be located at different points throughout the theatre. Since the length of the ductwork used to distribute the dehumidified air will be very considerable, the invention provides for a very substantial saving by eliminating the necessity for heavily insulating the distributing ducts, such as 12.

It will be apparent there has been provided an air conditioning system which, while it is essentially simple, and inexpensive to install and operate, is adapted effectively to provide desired atmospheric conditions within an enclosure.

Since many modifications may be made in the invention without departing from its scope, it is intended that all matter contained in the above description or shown in the accompanying drawing shall be interpreted as illustrative only and not in a limiting sense, applicant limiting himself only as indicated in the appended claims.

I claim:

1. The method of conditioning air which comprises subjecting the air to the action of a dehydrating agent, whereby the dewpoint temperature of the air is reduced, conveying the air thus conditioned to a point of utilization, reducing the dry bulb temperature of the air by intimately contacting said air with a readily vaporizable fluid in liquid form, then supplying the conditioned air to an enclosure to be conditioned, and controlling the amount of said vaporizable fluid which is contacted with said air in accordance with changes in a psychrometric condition of the air in said enclosure, and mixing said conditioned air with a secondary volume of unconditioned air withdrawn from the enclosure whereby an augmented supply of air substantially in constant volume will be discharged into the enclosure.

2. The method of conditioning air which comprises subjecting the air to the action of a dehydrating agent whereby the dewpoint temperature of the air is reduced, conveying said air to a point of utilization, reducing the dry bulb temperature of the air by intimately contacting said air with a readily vaporizable fluid in liquid form, then supplying the conditioned air to an enclosure to be conditioned, and also supplying to said enclosure other air withdrawn therefrom, controlling the proportions of conditioned air and return air supplied to said enclosure in accordance with changes in one psychrometric characteristic of air in said enclosure and controlling the degree to which said conditioned air is saturated by contact with said liquid in accordance with changes in another psychrometric characteristic of air in said enclosure.

3. The method of air conditioning an enclosure which comprises conditioning air to a relatively low dewpoint temperature and a relatively high dry bulb temperature, conveying the air thus conditioned to a point of utilization, reducing the dry bulb temperature of the air by intimately contacting said air with a readily vaporizable fluid in liquid form, then supplying the conditioned air to said enclosure and controlling the degree to which said conditioned air is saturated by contact with said liquid in accordance with changes in a psychrometric characteristic of air in said enclosure, and augmenting the volume of conditioned air substantially at the point of supply to the enclosure by a secondary volume of unconditioned air withdrawn from the enclosure.

4. The method of air conditioning an enclosure which comprises conditioning air to a relatively low dewpoint temperature and a relatively high dry bulb temperature, conveying the air thus conditioned to a point of utilization, reducing the dry bulb temperature of the air by intimately contacting said air with a readily vaporizable fluid in liquid form, then supplying the conditioned air to said enclosure and controlling the degree to which said conditioned air is saturated by contact with said liquid in accordance with changes in a psychrometric characteristic of air in said enclosure, also supplying to said enclosure other air withdrawn therefrom and controlling the proportions of conditioned air and return air supplied to said enclosure in accordance with changes in another psychrometric characteristic of the air in said enclosure.

CARLYLE M. ASHLEY.